US005480624A

United States Patent [19]
Kuivalainen

[11] Patent Number: 5,480,624
[45] Date of Patent: * Jan. 2, 1996

[54] METHOD FOR PURIFICATION OF WASTE GASES

[75] Inventor: Reijo Kuivalainen, San Diego, Calif.

[73] Assignee: A. Ahlstrom Corporation, Noormarkku, Finland

[ * ] Notice: The portion of the term of this patent subsequent to May 10, 2011, has been disclaimed.

[21] Appl. No.: 196,134

[22] PCT Filed: Aug. 22, 1991

[86] PCT No.: PCT/FI91/00260

§ 371 Date: Mar. 8, 1994

§ 102(e) Date: Mar. 8, 1994

[87] PCT Pub. No.: WO93/03824

PCT Pub. Date: Mar. 4, 1993

[51] Int. Cl.[6] .......................... B01D 53/14; B01D 53/50; B01D 53/68; B01D 53/74
[52] U.S. Cl. .................. 423/210; 423/242.1; 423/240 S; 423/244.07; 423/481; 95/92; 55/280
[58] Field of Search .................. 423/210, 240 S, 423/242.1, 244.07, 481; 55/280; 95/92

[56] References Cited

U.S. PATENT DOCUMENTS

| 4,305,909 | 12/1981 | Willett et al. | 422/169 |
|---|---|---|---|
| 4,322,392 | 3/1982 | Gleason et al. | 423/242 |
| 4,555,390 | 11/1985 | Bhatia | 423/242 |
| 4,600,568 | 7/1986 | Yoon et al. | 423/242 |
| 4,753,785 | 6/1988 | Kisters | 423/240 |
| 4,768,448 | 9/1988 | Nobilet et al. | 110/346 |
| 4,832,936 | 5/1989 | Holter et al. | 423/555 |
| 4,834,955 | 5/1989 | Mouche et al. | 423/242 |
| 4,908,195 | 3/1990 | Wanner et al. | 423/239 |
| 5,186,916 | 2/1993 | Nevels | 423/210 |
| 5,238,657 | 8/1993 | Kuivalainen | 422/172 |
| 5,310,528 | 5/1994 | Kuivalainen | 422/170 |

FOREIGN PATENT DOCUMENTS

| 146214 | 8/1983 | Denmark . | |
|---|---|---|---|
| 0191557 | 8/1986 | European Pat. Off. . | |
| 78401 | 4/1989 | Finland . | |
| 454142 | 4/1988 | Sweden . | |
| 1080836 | 2/1983 | U.S.S.R. . | |
| 9112876 | 9/1991 | WIPO | 423/240 S |

Primary Examiner—Gary P. Straub
Assistant Examiner—Timothy C. Vanoy
Attorney, Agent, or Firm—Nixon & Vanderhye

[57] ABSTRACT

Waste gases are purified by adding reagent and/or absorbent which reacts with pollutants in the gases to the gases, and then introducing the gases into a wetting reactor for activating the reagent or absorbent contained in the gases. The gases are introduced into a drying zone of the reactor and then passed upwardly into a wetting zone. The reagent or absorbent which has reacted partly or completely with the pollutants is separated from the gas by a filter in the upper section of the reactor and particles are intermittently detached from the filter and fall downwardly into an ash layer in the bottom of the reactor. The ash layer is capable of homogenizing wet particles and water droplets which fall downwardly from the wetting zone, and typically is at least about 25 cm thick. A mechanical mixer/grinder may be provided in the ash layer for mixing the particles and droplets and grinding lumps in the ash layer into particles.

20 Claims, 4 Drawing Sheets

METHOD FOR PURIFICATION OF WASTE GASES

The present invention relates to a method of purification of waste gases which are produced in, for example, combustion, gasification, or some chemical or metallurgical processes. Sulfur dioxides, ammonia, chlorine and fluorine compounds and condensing hydrocarbon compounds are typical pollutants contained in these gases. The present invention especially relates to a method in which reagent and/or absorbent which reacts with pollutants contained in the gases is activated by leading the gases into a wetting reactor. The reagent and/or absorbent is added to the process itself or to the gases discharged from the process. The gases are introduced into the wetting reactor for wetting them with water or steam in order to activate the reagent contained in the gases. The gases are first fed to the lower section of the wetting reactor and then further upwards to the wetting zone of thereof, where a suspension formed of the gas and the reagent is wetted with water or steam. The reagent and/or absorbent particles which have reacted either completely or partially are separated from the gases by a filter in the upper part of the wetting reactor before the gases are discharged from the reactor. Carbonates, oxides or hydroxides of, e.g., either alkali metals or alkaline earth metals are used as reagents or absorbents.

As known, combustion of fossil fuels produces flue gases which contain sulfur oxide and cause environmental acidification. The sulfur content of the flue gases varies depending on the sulfur content of the fuel. Efforts are made to find means for employing fuels which contain more and more sulfur even though the restrictions on sulfur emissions become tighter and tighter. Waste incineration plants, the number of which is continuously increasing, also produce sulfur-containing flue gases which have to be purified so as to be within the set limits. The flue gases produced in waste incineration plants when, e.g., plastic compounds are burnt contain, besides $SO_2$ and $SO_3$ emissions, also hydrochloric and hydrofluoric acids and other harmful gaseous and solid compounds.

Process gases produced in various gasification processes may also contain harmful amounts of sulfuric or other compounds which have to be separated from the gases prior to further treatment thereof.

BACKGROUND OF THE INVENTION

Several methods have been developed for cutting down sulfur emissions of combustion plants. The most common method used so far is wet scrubbing in which method the gases are scrubbed with a water suspension of a reagent, such as lime, reacting with, e.g., sulfur oxides. The water suspension is sprayed into a gas flow in a scrubber arranged after a combustor, whereby sulfur is absorbed into the water suspension and sulfur dioxide reacts with lime, forming calcium sulphate or calcium sulphite $$CaO+SO_2+\tfrac{1}{2}O_2 \rightarrow CaSO_4$$

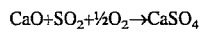

or $$CaO+SO_2 \rightarrow CaSO_3.$$

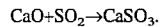

Water suspension is sprayed in such an amount that sulfur compounds thus formed have not enough time to dry, but they are discharged as a slurry from the lower section of the scrubber. The wet scrubbing process is complicated as it requires means for preparing water suspension and means for after-treatment thereof. Furthermore, the method usually requires additional energy for drying the produced slurry in a slurry after-treatment plant. Therefore, the water suspension is usually fed into the system as dry as possible in order to minimize the energy requirement. Due to the considerable amount of water suspension used, the gas may be cooled to a relatively low temperature in the scrubber and, consequently, the gas discharged from the scrubber may cause corrosion and clogging of filters. Further, energy is consumed for reheating the flue gases prior to leading them out of the system. In the wet scrubbing system, the separation degree of, for example, $SO_2$, is about 95%.

During the last few years, semi-dry scrubbing methods have been developed, in which a fine alkali suspension, e.g., calcium hydroxide suspension is sprayed through nozzles into a hot flue gas flow in a contact reactor where sulfur oxides dissolve in water and, when the suspension dries, are bound to the lime compound. Water is evaporated in the contact reactor so as to form a solid waste, whereby reaction products of, for example, sulfur and lime are readily separable from the gases by means of a filter. It is attempted to maintain the consistency of the calcium hydroxide suspension on such a level that the heat content of the flue gases is sufficient for evaporating the water therefrom. The thick lime suspension, however, easily deposits layers on the reactor walls and especially around the spray nozzles, and may finally clog the nozzles entirely. The reactors have to be dimensioned relatively large for minimizing the drawbacks caused by deposits. Furthermore, as separate equipment is required for the production of lime suspension, a considerable amount of equipment will be needed in the semi-dry scrubbing method as well, and the gas purification will be fairly expensive. A further drawback is the wearing effect of the lime suspension on the nozzles.

The semi-dry scrubbing method is advantageous for the process because the pollutants in the gases may be removed as dry waste. The process has drawbacks of being difficult to control and providing a sulfur absorption below 90%, which is less than in wet scrubbing. A still further drawback is that inexpensive limestone cannot be used in the semi-dry method because it is very slow to react with sulfur. Either calcium oxide or calcium hydroxide, which are much more expensive, have to be used instead. In big combustion plants, the cost of absorbent is remarkable.

Addition of limestone already into the actual combustion or gasification stage has also been suggested. As a result of such addition, limestone is calcined into calcium oxide in accordance with the following reaction $$CaCO_3 \rightarrow CaO+CO_2.$$

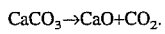

Calcium oxide is then capable of reacting already in the combustor with the sulfur oxides formed therein. The reaction takes place as follows:

$$CaO+SO_2+\tfrac{1}{2}O_2 > CaSO_4.$$

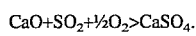

When the reactions proceed, calcium sulphate or calcium sulphite layers, however, cover the surface of the calcium oxide particles preventing sulfur from penetrating the particles, thereby slowing down and finally preventing the reactions between sulfur and lime. Thus, lime will not react completely and will not, therefore, be optimally utilized. Many other parameters, such as Ca/S mole ratio, temperature and residence time also affect sulfur absorption.

The closer to the dew point the reactions take place, the higher the reactivity of alkali compounds becomes. Better reactivity is caused by the fact that, in a wetted particle, reactions take place in a water phase as fast ionic reactions. Close to the dew point, the particles stay wetted and the reactivity also remains on a desired level for a longer time.

The moistness of the particles is preferably maintained on such a high level that water surrounds the particles, also penetrating them. As the water penetrates the lime particles, the sulphate or sulphite layer deposited on them will be broken, thereby revealing new reactive lime area. Sulfur dioxide contained in the gases dissolves in the water surrounding the particles and reacts with calcium compounds in the liquid phase.

Finnish patent specification 78401 discloses a method in which sulfur dioxide of flue gases is caused to react in a reaction zone and to be thereby transformed into solid sulphates and sulphites separable from the flue gases. The flue gases are conducted into the lower section of a vertical, lengthy contact reactor. Additionally, powdered lime and water are separately brought into the reactor from several points for the sulfur to be absorbed by lime. Flue gas suspensions are discharged from the upper section of the flow-through reactor and are further conducted to a dust separation stage. By feeding the powdered lime and water separately into the reactor, production, treatment, and spraying of a water suspension are avoided. According to the specification, this method, when used in sulfur absorption with calcium oxide, results in about 80% $SO_2$ reduction with a mole ratio of Ca/S=1.56 and about 90% $SO_2$ reduction with a mole ratio of Ca/S=2.22. The 98% $SO_2$ reduction is not achieved until the mole ratio is Ca/S=4. In this method either, the temperature of the flue gas flow must not be allowed to drop optimally close to the dew point as the solids contained in the flue gas suspension then would deposit layers on the walls of the tubes and other equipment, thus causing troubles in dust separation.

European patent specification 0 104 335 discloses another two-phase, semi-dry flue gas purification system. In this method, dry reagent is fed into the flue gases in a contact reactor in a first stage and water or an aqueous solution, to which dissolved reagent has been added, in a second stage. In the first stage, an inactive surface layer is formed on the reagent particles. The layer slows down or prevents reactions between the reagent and, e.g., sulfur oxide. By adding water in the second stage, the reagent is reactivated. In this manner, the reagent is utilized more completely. The gas temperature is allowed to decrease to a level on which it always stays above the dew point, for example, to 105° C. The gas temperature must not, in this method either, be allowed to decrease too close to the dew point because any wetted particles possibly formed would cause difficulties in the long run, even if the reactivity of the reagent at a lower temperature would be much better. According to the method, the required amount of reagent may be reduced by recycling reagent-containing solid material which has been separated from the gas at a later stage and then regenerated by either grinding or some other way. A drawback of this method is, however, separate equipment needed for handling and storing of the recycled solids.

U.S. Pat. No. 4,509,049 suggests a dry gas purification system in which lime is added to flue gases in a boiler and the lime is then allowed to react with the flue gases in a reactor. The lime, which has partly reacted with the pollutants in the flue gases, is separated from the gases in a filter in the upper section of the reactor. The dry lime thus separated from the gases is collected and ground and then treated with dry steam in order to increase the reactivity of the dry lime, whereafter the lime is recycled into the gas flow at a location prior to the reactor. The dry steam treatment of lime takes 2 to 24 hours, which is a long time involving high consumption of energy.

An object of the present invention is to provide an improved method of purification of waste gases containing, e.g., sulfur, chlorine and fluorine compounds or other condensable compounds.

Another object of the invention is to provide a method by which, e.g., sulfur reduction can be considerably improved, preferably even so that the amount of the reagent need not be increased.

A further object of the invention is to provide a method by which a gas to be purified may be wetted very close to the dew point, for example, 0°–20° C. therefrom, in a wetting reactor, the method still allowing the particles separated from the gases to be removed in a dry state in the wetting reactor.

SUMMARY OF THE INVENTION

For achieving the objects described above, it is characteristic to the method according to the invention that—so thick an ash layer is maintained below the gas inlet level in the lower section of the wetting reactor that the ash layer, formed of particles separated from the gas, is capable of homogenizing the wet ash particles and water drops falling downwards from the upper section of the wetting reactor.

In the ash layer is preferably disposed a mechanical mixer, e.g., a blade mixer for mixing and grinding possible lumps of particles smaller so as to homogenize the temperature and moistness of the ash layer. The purpose is to maintain the ash layer preferably so dry that the ashes may be conveyed out of the wetting reactor pneumatically. The volume of the ash layer is maintained in the lower section of the wetting reactor, e.g., by regulating the amount of ashes discharged. Preferably the amount of the ash layer is at least 50 kg per 1 $m^3/s$ of fed gas. In practice, with a wetting reactor having a relatively straight bottom, this would mean an ash layer of at least about 25 cm at the bottom of the reactor. If the reactor bottom is V-shaped, the ash layer has to be thicker. It has been found that prerequisite for an effective function of a horizontal blade mixer is that the ash level is preferably higher than the shaft of the mixer. On the other hand, the ash layer should not generally be thicker than what is required for an effective function of the mixer in the upper part of the ash layer and for its capability of throwing particles from the ash layer to the gas space thereabove. Neither should the ash level be higher than the actual inlet level of the gas.

The hot gas introduced into the reactor may also serve as a drying gas, and it is brought into contact with and to dry wetted ash particles and lumps of particles flowing downwardly from the wetting zone. Ash particles from the lower section of the reactor are carried away by the upwardly flowing drying gas and conveyed back upwards into the wetting zone in order to activate the still unreacted reagent or absorbent contained in the ash. In the wetting reactor, the particles are separated from the gases by means of a filter and are then returned to the lower section of the reactor. In this way, an internal circulation of reagent or absorbent particles is brought about in the wetting reactor and a relatively high density of particles is maintained therein.

The particles are separated from the gas, e.g., in a fabric filter, electric filter or some other equivalent type of separator. Particles are detached from the filter either intermittently or continuously, e.g., by pulse flushing, backwash or shaking, whereby the particles drop either separately or in lumps downwards in the wetting reactor.

At least a part of the particles stick to each other in the wetting zone or at the filter and form bigger agglomerates and pass thereafter downwards through the wetting zone all the way to the lower section of the reactor, whereas single small particles are easily carried away by the upwardly flowing gas and are conveyed from the wetting zone into the upper section of the reactor. Bigger lumps of particles and wet, heavy particles are dried and ground into finer particulates by mixing when they reach the ash layer in the lower section of the reactor.

Thorough mixing of the particles by mixing members in the lower section of the reactor gives a positive effect, equalizing heat and moistness in the ash layer, for homogenizing the ash material. As the particles are ground smaller, their reactive area increases and at least part of them whirls upwards above the ash level, being consequently carried away with the drying gases upwards and back into the wetting zone. In the wetting zone, the particles are reactivated and will again be capable of absorbing sulfur in the reaction zone. Mixing, which has been brought about by a mechanical or equivalent strong mixer, has been found to be of essential importance to the runnability of the wetting reactor. The task of mixing is to serve as transfer means for ashes, conveying them from various parts of the reactor bottom towards the outlet/outlets;

to homogenize the ashes by mixing them to a suitable form for preferably pneumatic transfer;

to crush moist or dried lumps of ash to a fine form.

Dry ash, which falls down during filter cleaning or is otherwise separated from the flue gas when it enters the reactor, serves as an efficient drying agent for the moist ash and water drops falling down from the wetting zone. The mixer mixes moist and dry substances, whereby the earlier mentioned homogenization is effected.

The mixer also whirls ashes above the ash layer or ash buffer, whereby the hot gas (flue gas) conducted to the lower level carries it away, thereby causing internal ash circulation in the reactor. This will further intensify the transmission of the drying energy relieved by the gas to moist ash particles.

Mixing and recycling of the particles increases the residence time, dust density, Ca/S mole ratio and total surface area of the lime particles in the reaction zone, thereby decreasing the need for new reagent. According to the invention, an average particle density is maintained by internal circulation in the wetting reactor, which density is clearly higher than the particle density in the gas introduced into the reactor. The internal circulation can be controlled by regulating the amount and velocity of the particle flow whirling upwards from the ash layer. The location of the feeding point of the inlet gas also has an effect on the recycling. The shorter the distance from which the gas spray is directed to the ash layer, the more particles are entrained with the gas spray and are carried upwards therewith.

Part of the particles is preferably removed from the reactor through an outlet disposed in the lower section of the wetting reactor below the drying zone. Part of the discharged particles may be returned to the wetting reactor if desired. Thus, external circulation of particles may also be provided in connection with the wetting reactor. Particles may be treated outside the reactor, for example, to regenerate some reagent.

The particle density may be controlled in the reactor by regulating the amount of particles removed from the lower section of the reactor, for example, by leading particles from the ash layer over an adjustable overflow level to an ash discharge opening and further to an ash discharge duct. The volume of the ash layer may also be adjusted by a level control means, which controls the flow through a discharge opening or discharge duct.

External particle circulation in the wetting reactor may be provided by connecting a filter or an equivalent particle separator, which is either totally or partly disposed outside the reactor, to the upper section of the wetting reactor. In such a filter or particle separator, reacted and still unreacted absorbent particles are separated from the gases, at least part of which particles is directly returned to the lower section of the wetting reactor, preferably to the drying zone. Particles may be detached from the filter either continuously or intermittently and be returned to the lower section of the wetting reactor. Part of the material separated by means of the particle separator may be totally removed from the system.

By the method according to the invention, it is possible to decrease the average temperature of the gases in the wetting reactor to a level which is about 0°–20° C., preferably 0°–10° C., from the dew point, and even to the actual dew point, and still to avoid the drawbacks caused by too wet particles in the upper or lower sections of the reactor. The particles wetted in the wetting zone and falling downwardly are dried by the hot gas flow in the drying zone, thereby not causing any trouble in the lower section of the reactor. Due to recycling, the differences in temperature and moistness are very small also above the wetting zone, at various cross-sectional points of the reactor. In this way, local troubles caused by wetted particles or water drops are avoided.

In accordance with a preferred embodiment of the invention, layers formed by wetted particles on the walls of the wetting reactor may be avoided in such a manner that at least a part of the gas fed into the wetting zone is conducted into the wetting reactor as jacket flow so that the gases, either indirectly or directly, heat the reactor walls. The gas is conducted into the reactor through ducts disposed, e.g., in the walls, whereby the hot gas flowing in the ducts prevents the walls from cooling and thereby solids from depositing layers on the walls. The gases may also be injected directly to the inside of the reactor and caused to flow downwardly along the walls, protecting the walls. Thereby, the wetted particles are either directed away from the wall or they dry when passing through the jacket flow prior to touching the wall. The jacket flow is brought about by feeding gas, e.g., into a cylindrical reactor via an annular opening in its wall.

Removing of deposits from the walls may also be intensified by shaking or by constructing the walls of flexible material, whereby pressure fluctuations normally occuring in the system will shake the walls, causing the deposits to fall down.

Especially in big reactors, gas may also be introduced into the inner part of the wetting zone for providing a gas distribution as even as possible in the reactor. Gas may be fed, e.g., through a plurality of nozzles or slots disposed in the gas duct in the middle part of the reactor. Gas may also be fed into the wetting reactor from several different levels.

The hot gas introduced into the lower section of the reactor is of great significance because its task is, e.g.

to relieve drying energy for drying moist ash or water drops;

to convey ashes whirled by the mixer back to the wetting zone, thereby providing an internal ash circulation in the reactor; and to maintain the reactor walls warm, which further reduces the tendency to deposit layers on the walls.

By sprays of water or steam, a wetting zone is provided in the upper or middle section of the wetting reactor. Water is preferably sprayed into the flue gases, mainly downwards from above the gas inlets. Sprays of water or steam are preferably so arranged that as much as possible of the gas flow is evenly covered.

The wetting zone of the wetting reactor is preferably provided with downwardly directed water or water vapor nozzles, disposed, for example, in the support members running horizontally through the wetting reactor.

The filter disposed in the upper section of the wetting reactor is preferably a fabric filter such as a hose or cassette filter, or possibly an electric or some other equivalent type of filter, wherefrom particles are returned to the lower section of the reactor by shaking or back-blowing the filter.

The lower section of the reactor is preferably provided with a mechanical mixer, mixing solid material accumulated in the lower section of the reactor. Mixing of solid material intensifies the equalization of the moistness and heat of the particles, whereby the particles which are still wet will be dried when coming into contact with drier and hotter particles. At the same time, the mixer breaks the lumps of particles so as to facilitate them to be conveyed upwards in the reactor by the gas flow. Thus, the mixer intensifies the effect of the drying gas for bringing about internal circulation of particles in the reactor. The speed of the mixer is adjustable, and together with the gas flow entering the mixing area, a wide range of adjustment of particle circulation is thereby provided.

The lower section of the wetting reactor is provided with means for discharging particles from the reactor. Particles are preferably discharged by the mixer described above. The blades of the mixer can be directed askew so that they gradually move particles to one end of the lower section of the reactor, wherefrom the particles can be removed dry through a suitable sealing means. They may also be removed by a separate discharge screw or a discharge conveyor. Particles are discharged from the wetting reactor preferably in such a dry state that they can be further conveyed, for example, pneumatically.

The discharge opening has to be so disposed that an ash storage is formed in the mixer, the volume (height) of the ash storage depending on the mixer dimensions. For example, if a blade mixer is used where the shaft is horizontal, the ash level is preferably at least the same as the shaft level. However, the ash level should not exceed the point above which the mixer no longer has any mixing effect in the upper layer of ash. With blade mixers, the effective height is about 1 to 4 times the mixer diameter. The mixer diameter is about twice the blade length.

Besides blade mixers with horizontal shafts, also other types of mixers may be used. Cylindrical reactors may employ, e.g., vertical mixers or jet-mill based local mixers or grinders where steam or air brings about the mixing effect.

If necessary, the lower section of the wetting reactor may be provided with a separate feeding point for reagent or absorbent. Several different reagents may be introduced into the wetting reactor for removing harmful substances from the gases in one stage.

The arrangement according to the invention provides e.g. the following advantages over the earlier known arrangements:

Several functions, such as sulfur absorption, wetting of reagent, particle separation and drying, may be concentrated in one apparatus. Wetting of gas may be arranged in the same space as the existing ash separation, whereby neither extra devices nor separate reactors are needed for each partial process.

By the present invention, it is possible to operate very close to the dew point, even almost at the dew point, as the filter is directly arranged in the reactor, and no gas ducts are needed, whereby the problem of layers depositing on the walls of such gas ducts is avoided in conveyance of gas which becomes wet when close to the dew point. The possibility of operating close to the dew point results in a highly efficient elimination of $SO_2$, $SO_3$, HCl and HF emissions.

Internal circulation of particles through the wetting zone cuts down the consumption of reagent or absorbent. By this method, the residence time of the absorbent in the reactor becomes essentially longer, preferably about 2 to 10 times longer in comparison with earlier known once-through reactors.

Fine ash is also separated from the gases in this apparatus. Ash and consumed absorbent may be recovered dry and in a common step. Only one ash removal system and ash treatment is needed. Dry ash and absorbent may be conveyed pneumatically.

In the earlier known methods, only if the $SO_2$ content of the inlet gas has been <40 ppm, almost complete sulfur absorption has been provided in the wetting stage with $SO_2$ containing gases. By the method of the invention, complete sulfur removal is possible even though the $SO_2$ content of the inlet gas is >100 ppm.

The method is simple.

In the arrangement according to the invention, three main factors having an positive effect on absorbing reactions may be used simultaneously and optimally:

cooling of gas to a temperature level which is close to the dew point in order to provide fast reactions;

high Ca/S mole ratio in the reaction zone; and long residence time for optimal utilization of the absorbent.

BRIEF DESCRIPTION OF THE DRAWINGS

The invention is further described below, by way of example, with reference to the accompanying schematic drawings, in which.

DESCRIPTION OF THE PREFERRED EMBODIMENTS

Figure 1:
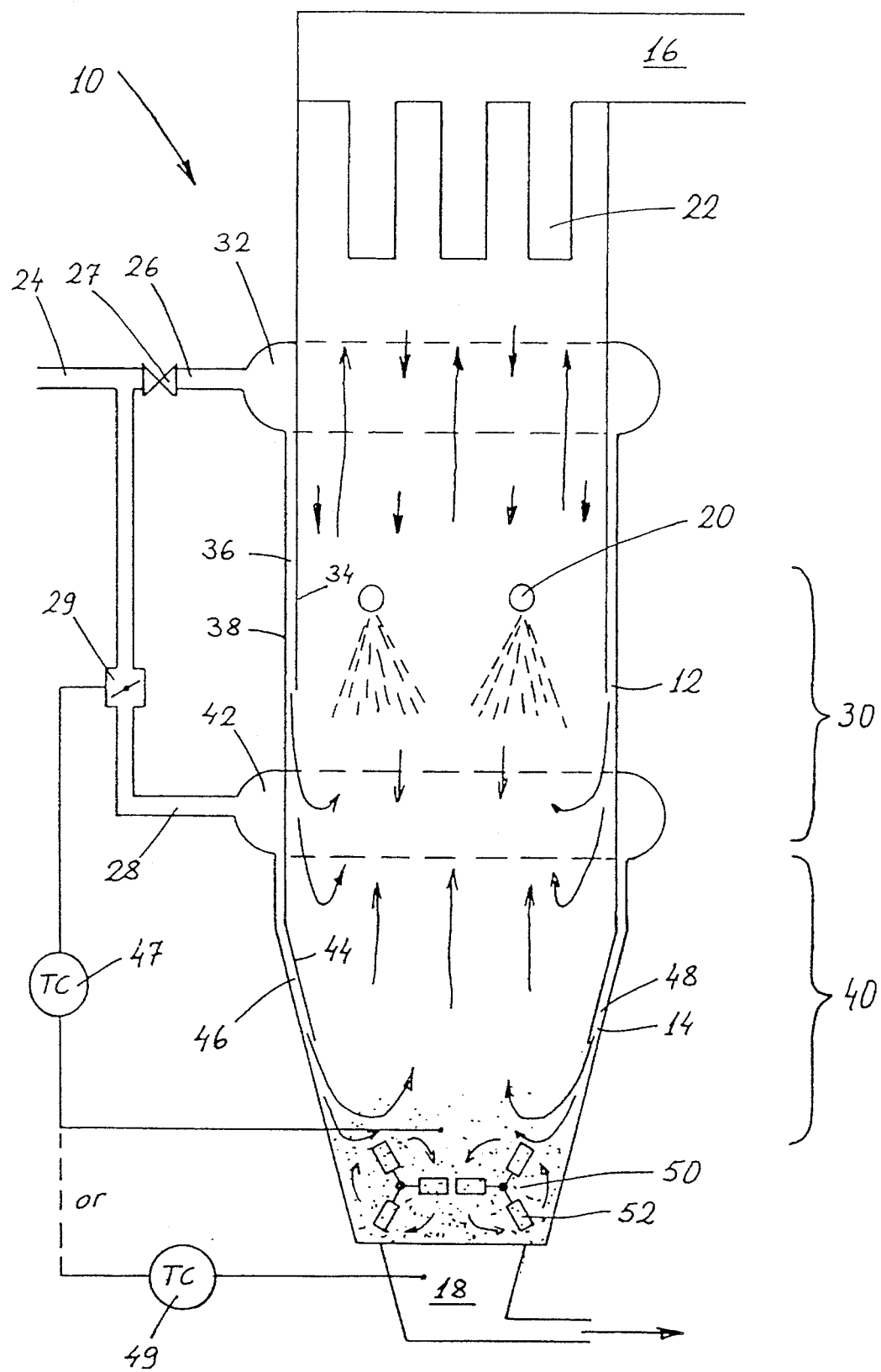
FIG. 1 is a schematic illustration of a preferred apparatus for implementing the method of the invention.

FIG. 1 discloses a wetting reactor 10 provided with gas inlets 12 and 14, a gas outlet duct 16 and a discharge duct 18 for particles separated from the gas. The wetting reactor is also provided with nozzles 20 for spraying water or steam into the wetting reactor above the gas inlets. The upper section of the reactor is provided with a filter 22 for separating particles from the upwardly flowing gas.

The wetting reactor according to the invention may be disposed in the flue gas duct after the combustion chamber of a grate furnace, pulverized fuel combustor or fluidized bed combustor, such as a circulating fluidized bed reactor, whereby the wetting reactor is preferably disposed after the heat recovery boiler. Prior to entering the wetting reactor, the flue gases are cooled to <300° C., preferably to <150° C. For removing sulfur oxides from the flue gases, absorbent, such as limestone, has been fed into the combustion chamber or fluidized bed reactor or thereafter. The absorbent is at least partly calcined in hot flue gas to calcium oxide, which absorbs sulfur as calcium sulphate and calcium sulphite. The lime/sulfur ratio of 1.5–2.1 produces about 80 to 95% sulfur reduction in a circulating fluidized bed reactor. The flue gases still contain sulfur as well as unreacted lime when entering the wetting reactor. An important object of the wetting reactor according to the invention is to activate lime or other absorbent in the flue gases so that the rest of the sulfur will also be removable from the flue gases.

In the arrangement shown in FIG. 1, flue gases containing sulfur and lime are conveyed through pipe 24 into the wetting reactor. Prior to feeding the flue gases into the reactor, they are divided into two separate flue gas flows in ducts 26 and 28. The flue gas flow in duct 26 is conducted into the reactor, substantially to the same level as the water sprays 20. The flue gas flow in duct 28 is conducted to a substantially lower level.

One flue gas flow is conducted into the wetting reactor substantially to the same level as the water sprays, either above or below or to exactly the same level as the water sprays. It is essential that the gas fed into the reactor is well mixed with the water spray. Both the gas and the water are preferably fed into the reactor as a downwardly flowing spray, which, at a small distance from the inlet, turns upwards. In this manner, vortices of gas and water spray are provided in the wetting zone and thereby also a good mixing effect.

The water sprays constitute a wetting zone 30 in the wetting reactor. In this wetting zone, the flue gases are wetted and cooled as close to the dew point thereof as possible, preferably to about 0°–3° C. therefrom. In the wetting zone, the lime particles are wetted, whereby sulfur is absorbed by the particles and fast ionic reactions between sulfur and calcium can take place in the liquid phase.

Water is preferably sprayed from nozzles, which produce small drops, preferably <100 µm in size, and which are large-angled so that the reactor cross-section and the gas flow are well covered. Water is sprayed downwardly. The wetting zone covers the vertical zone of the reactor which preferably equals the hydraulic diameter of the reactor.

In the embodiment shown in FIG. 1, flue gas is introduced into the reactor as jacket flow. From duct 26 the gas is first conveyed into a tubular duct 32 surrounding the reactor. From the tubular duct, the gases are further conveyed into one or more downwardly directed ducts 36 defined by the reactor wall 34. The reactor is double-walled so as to form an inlet duct 36 for flue gas between the walls 34 and 38. From ducts 36, the flue gases are conveyed through inlets 12 into the wetting zone 30 in the reactor.

Correspondingly, gas is conducted from the lower gas duct 28 to a tubular duct 42 surrounding the reactor and therefrom further to a downwardly directed duct 46 defined by the reactor walls 44. From that duct 46, the flue gases flow into the lower section i.e. the drying or mixing zone 40, of the reactor.

Introduction of gas into the wetting reactor is controllable, e.g., by means of dampers 27 and 29 in ducts 26 and 28. Introduction of gas is also controllable by means of an adjustable slot 48 in the duct 46.

The gases flow from the drying zone upwards, thereby drying particles flowing downwardly from the filter and the wetting zone. The flow of drying gas is automatically adjustable by members 47 and 49, in accordance with the temperature of the gas in the lower section of the reactor or the temperature of the particles to be discharged.

Further, the lower section of the reactor is equipped with mechanical mixers 50. The embodiment shown in FIG. 1 has two such mixers lying on the bottom of the reactor and being provided with blades 52. The mixers break the lumps of particles falling down to the lower section of the reactor. At the same time, they equalize the temperature and moistness between the particles. The mixers operate preferably so that they "splash" a portion of the particles from the ash layer upwards to the gas space of the drying zone, wherefrom the upwardly flowing hot gas flow carries these particles through the wetting zone possibly as far as the upper section of the reactor. The mixer blades are preferably so disposed that they, when rotating, gradually move particles to one end of the lower section of the reactor, said end being provided with a discharge duct 18 for particles. The particles preferably flow over an over-flow plate, not disclosed, into the discharge duct. In this manner, a "buffer" of particles, which equalizes the temperature and moistness of the down-flowing particles, is always maintained in the reactor.

Figure 2:
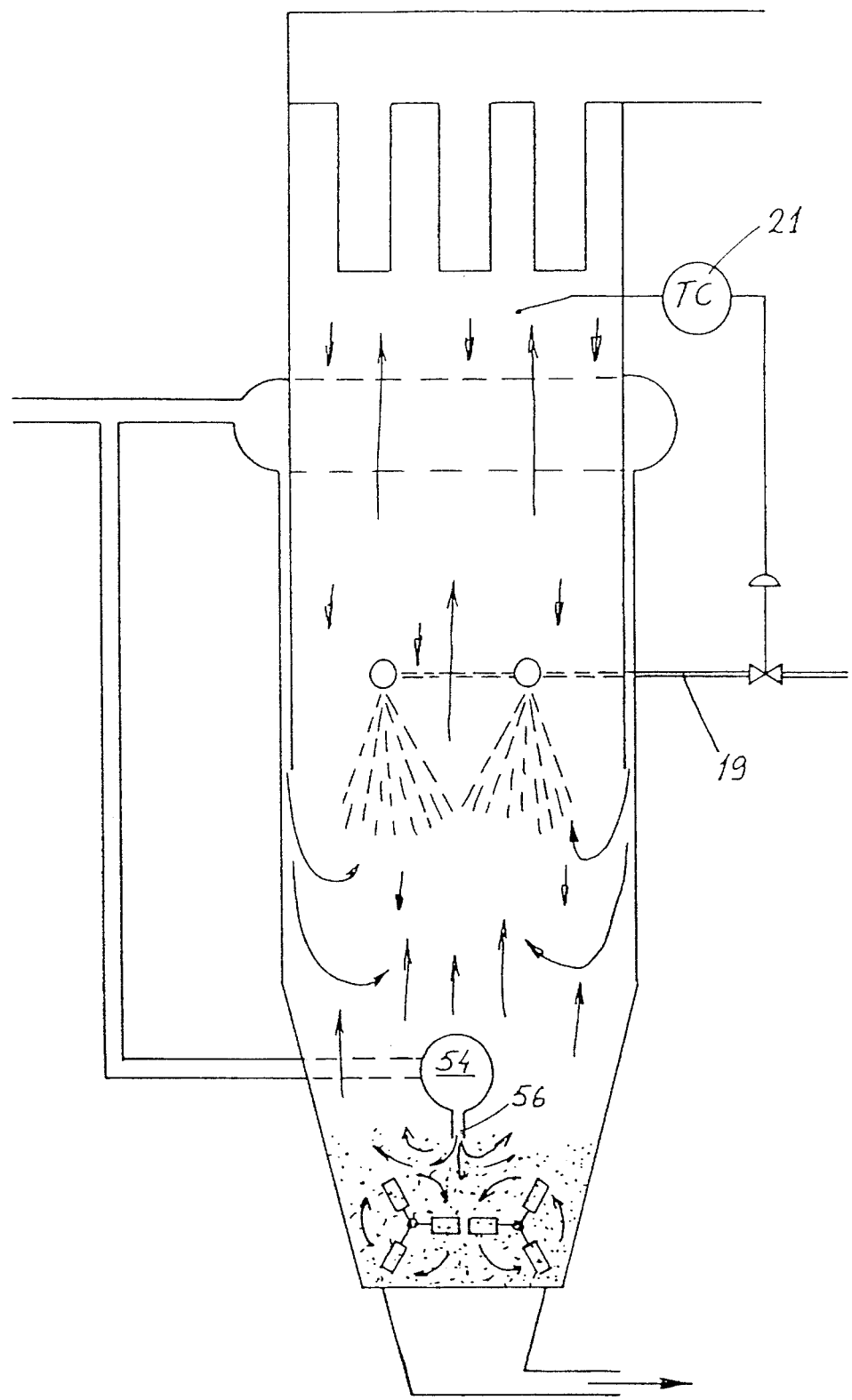
FIGS. 2 and 3 are schematic illustrations of two other apparatuses for implementing the method of the invention.

FIG. 2 shows a wetting reactor 10 similar to that of FIG. 1, except that gas is introduced into the lower section of the reactor via a gas inlet duct 54 disposed inside the reactor. The gas inlet duct is provided with downwardly directed nozzles 56, through which the gas first flows towards the particles accumulated in the lower section of the reactor and thereafter upwards. In this way, mixing is provided also by means of gas among the particles accumulated in the lower section of the reactor.

In the reactor according to FIG. 2, the amount of water fed into the wetting zone is regulated by a member 21 according to the temperature of the gas in the upper section of the reactor. The wetting reactor may be provided with water nozzles on several different levels if required for the gas to be evenly wetted.

In FIGS. 1 and 2, the reactors are made up of hose filter chambers, each of which has a standard filter and, in the lower section of the chamber, a wetting zone and a drying zone.

Figure 3:
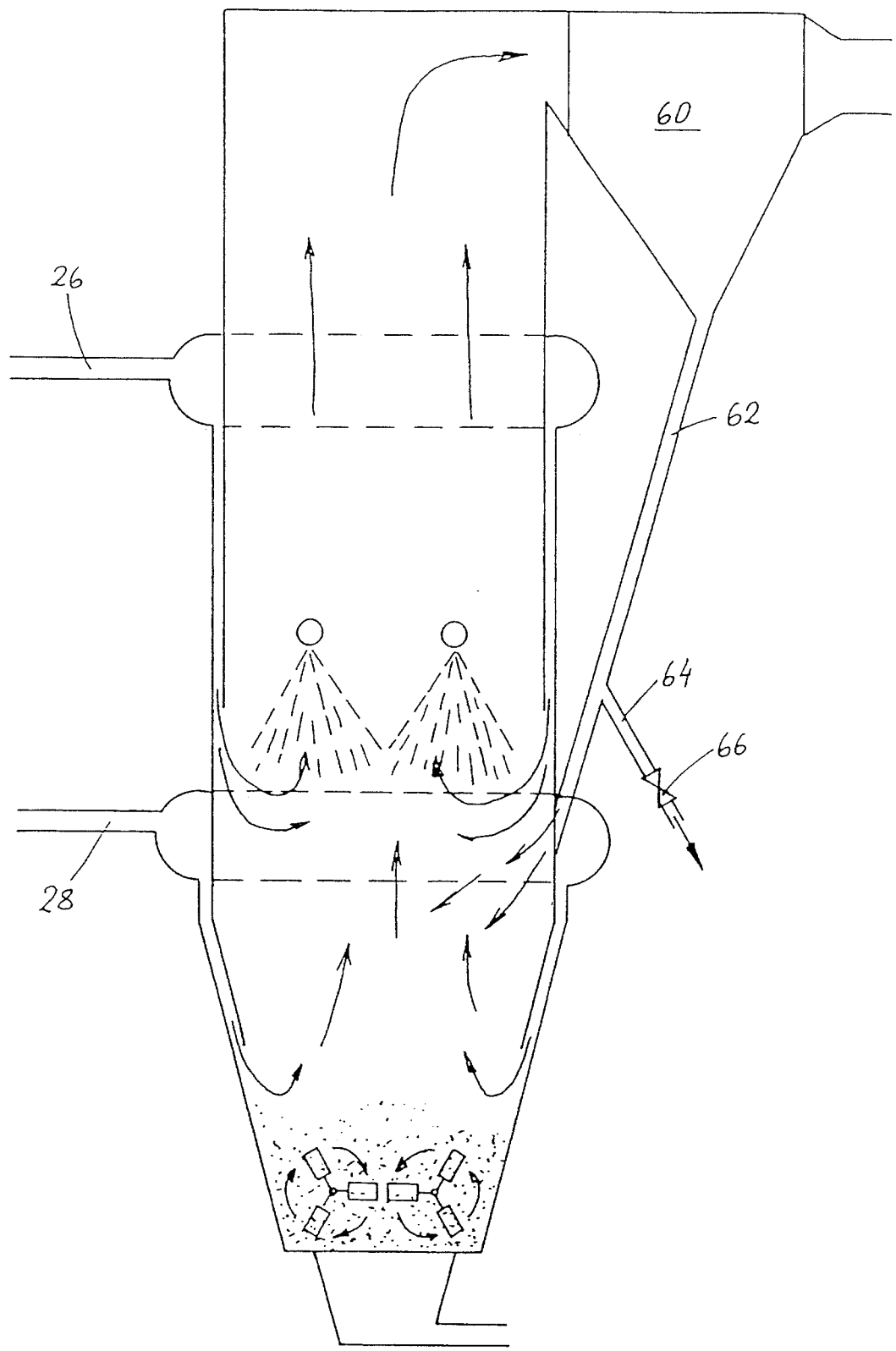

FIG. 3 illustrates a reactor in which a filter 60 is disposed immediately outside the reactor chamber. Thus, in addition to internal circulation, also external circulation of particles is effected in the reactor. Some of the particles wetted in the wetting zone 30 separate from the gases by themselves and flow, because of their weight, down to the drying section, where they become under the influence of the drying gas. After drying, the particles again flow upwards, entrained with the gases, thereby constituting internal circulation. Part of the wetted particles follow the gases to the upper section of the reactor and to the filter 60 and will be returned via duct 62 to the drying section 40. If necessary, particles may be removed from the circulation by outlet means 64, which may be closed by a valve 66.

In FIG. 3, the flue gas inlet ducts 26 and 28 may be connected to different points of the combustion processes, for example so that, the gas brought into the reactor via duct 26 has been more cooled than the gas brought via duct 28, which duct may bring hotter gas for ensuring the drying process.

Compared with the prior art, the invention provides much better sulfur absorption of flue gases with much lower lime consumption, as indicated by the accompanying results of tests made on certain coal and limestone grades.

EXAMPLE

Means in accordance with FIG. 1 was used in the test run. The wetting reactor was supplied with flue gases of about 870° C. from a circulating fluidized bed reactor, which had been supplied with limestone the mole ratio Ca/S being 1.41–2.33. The theoretic $SO_2$ content of the flue gases was 860 to 960 ppm. The sulfur contained in the flue gases reacted already in the circulating fluidized bed reactor prior to the wetting reactor in such a manner that the $SO_2$ content of the flue gases entering the wetting reactor was about 60 to 201 ppm. The gases were conducted into the wetting reactor at a temperature of about 139° to 160° C. The theoretic dew point of the gases in the wetting reactor was about 54° C.

The test results are shown by the table below.

| Ca/S mol/mol | Temp. after reactor °C. | $SO_2$ before reactor ppm | $SO_2$ after reactor ppm | $SO_2$ abs. % |
|---|---|---|---|---|
| 1.88 | 55 | 201 | 27 | 97 |
| 1.91 | 55 | 111 | 2 | 100 |
| 1.95 | 55 | 107 | 0 | 100 |
| 1.94 | 57 | 105 | 0 | 100 |
| 2.33 | 57 | 129 | 2 | 100 |
| 1.93 | 59 | 60 | 0 | 100 |
| 1.41 | 61 | 183 | 83 | 91 |
| 1.87 | 63 | 121 | 25 | 97 |
| 2.00 | 66 | 136 | 61 | 93 |
| 2.08 | 81 | 77 | 53 | 95 |

The test results clearly indicate that, by the method according to the invention, sulfur absorption is almost complete even with very low Ca/S mole ratios when the final reactions take place nearly at the dew point, i.e. 1°–5° C. from the dew point. Very good results are achieved even with the highest temperatures, i.e. 10°–30° C. from the dew point, and with much lower lime consumption than in earlier known methods.

According to information in literature, the wetting reactors of prior art have given about 90% $SO_2$ reduction with a mole ratio of Ca/S=2.22. About 98% $SO_2$ reduction has not been achieved until the mole ratio has been Ca/S=4.

Figure 4:
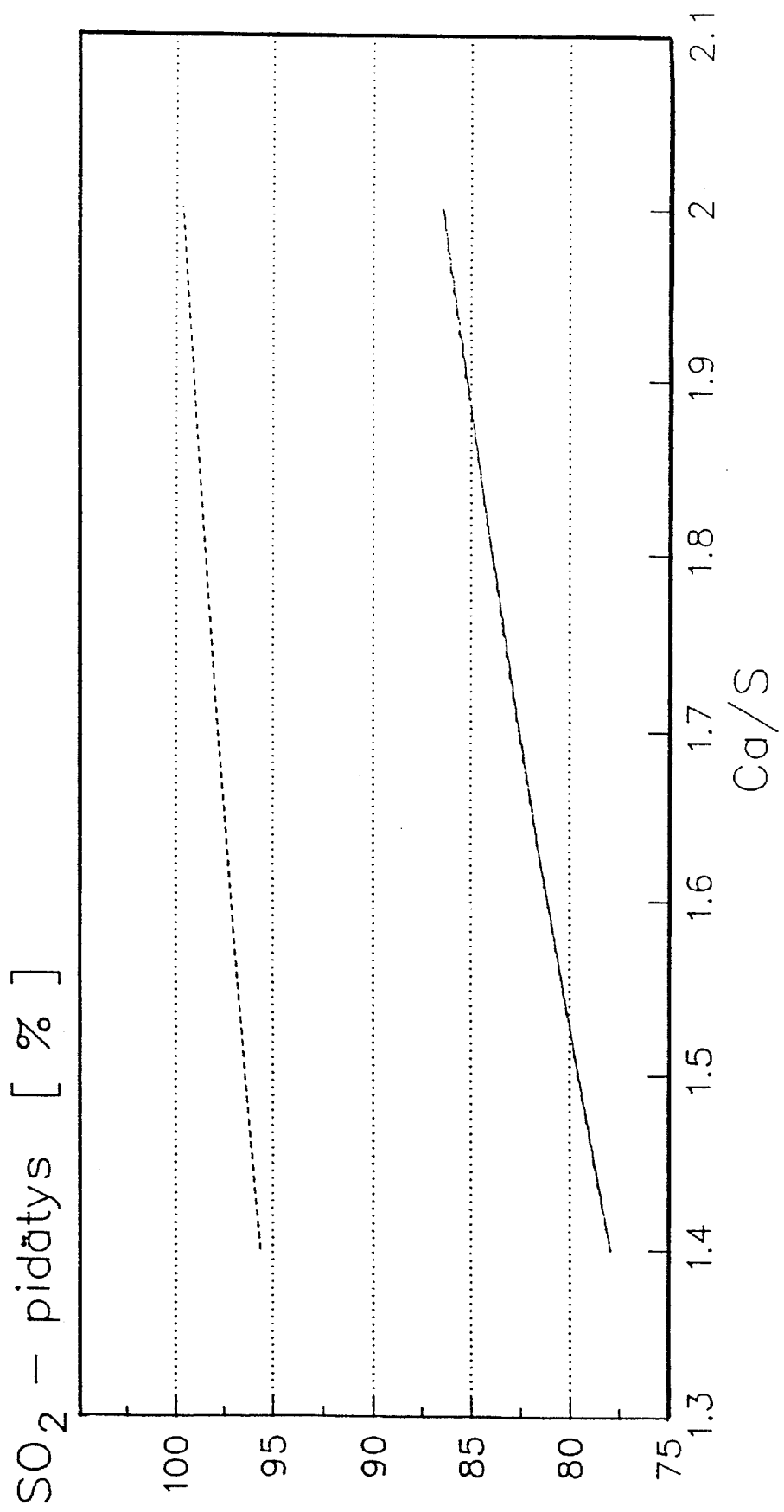
FIG. 4 shows the ratio of $SO_2$ reduction to Ca/S mole ratio in an embodiment of the invention.

FIG. 4 shows the ratio of $SO_2$ reduction to Ca/S mole ratio received in the above described series of test runs when applying the method according to the invention. As a comparison, the figure also shows the ratio of $SO_2$ reduction to the Ca/S mole ratio when the test run is performed without the wetting reactor.

As a conclusion, the present invention enables combining of various stages of several different processes into a whole:

A wetting reactor, made up of the space below the filter cassettes or the like. A nozzle system disposed in this space sprays water for wetting the ash and absorbent particles and for dropping the flue gas temperature close to the dew point, i.e. 0°–20° C. therefrom.

A fabric filter or the like, which operates either on the ordinary counterflow cleaning principle, with pressure pulses, backwash or shaking.

Combined mixing and transfer means for ash and absorbent, disposed, for example, in the receiving hopper at the bottom of the reactor. The mixing means preferably rotates at such a high velocity that it breaks the deposits which, when wet, fall down from the walls and filter, and which are dried by the hot gas flow.

Circulation of ash and absorbent, which is brought about by blowing part of the incoming flue gas into the reactor via the lower section thereof. Gas may also be blown into the reactor from below the mixers in such a manner that the gas fluidizes the particle mass accumulated in the lower section of the reactor. The gas introduced into the reactor from the lower section thereof together with the main gas flow coming from the side walls dries the wet lumps of particles falling down from the upper section of the wetting reactor. The gases catch part of the particles back into the wetting zone, thereby resulting in an internal circulation of particles in the wetting reactor.

We claim:

1. A method of purifying gases produced during combustion, gasification, or chemical processes, the gases including pollutants including sulphur oxides, chlorine compounds or fluorine compounds, utilizing a wetting reactor having a drying zone in a lower section thereof, and a wetting zone above the drying zone, comprising the steps of:

(a) either during or after the combustion, gasification, or chemical process, adding to the gases at least one of a reagent and an absorbent capable of chemically reacting with or extracting at least one pollutant in the gases;

(b) introducing the gases into the drying zone of the wetting reactor, and then causing the gases to pass into the wetting zone to wet the gases, reagent and absorbent with water in order to activate the reagent or absorbent;

(c) separating completely or partially reacted reagent and absorbent, and other particles, from the gases prior to discharging the gases from the wetting reactor:

(d) after step a), discharging the gases from the wetting reactor; and (e) maintaining a day layer of particles separated from the gases below the inlet of the gases into the lower section of the wetting reactor, in the layer homogenizing the particles being homogenized and any water droplets falling from the wetting reactor wetting zone.

2. A method as recited in claim 1 wherein step (c) is practiced by passing the gases through a filter located in the wetting reactor above the wetting zone, and wherein step (e) is practiced by intermittently detaching particles from the filter and causing the particles to fall downwardly into the layer.

3. A method as recited in claim 2 wherein the homogenization is done by a mechanical mixer in the layer and, the mixer also causing some of the particles from the layer to move upwardly into the drying zoned gases from step (b) carrying the particles into the melting zone.

4. A method as recited in claim 1 wherein during the practice of step (b) the gases flow into contact with wet particles flowing downwardly from the wetting zone.

5. A method as recited in claim 1 wherein during the practice of step (b) the gases entrain particles accumulated in the lower section of the wetting reactor and carry them into the wetting zone.

6. A method as recited in claim 1 wherein the homogenization is done by a mechanical mixer in the layer and, the mixer also causing some of the particles from the layer to move upwardly into the drying zone, gases from step (b) carrying the particles into the wetting zone.

7. A method as recited in claim 6 wherein the homogenization includes grinding lumps into particles.

8. A method as recited in claim 1 wherein step (b) is practiced by directing the gases at least partly downwardly during introduction into the wetting reactor so that the gases break up lumps of particles in the layer, and effect mixing of particles and water droplets in the layer.

9. A method as recited in claim 1 comprising the further step (f) of periodically discharging some particles in the layer from the wetting reactor.

10. A method as recited in claim 9 comprising the further step of (g) recycling particles discharged from the wetting reactor into the wetting reactor.

11. A method as recited in claim 10 comprising the further step of (h) during the practice of step (g) wetting the particles exteriorly of the wetting reactor.

12. A method as recited in claim 1 wherein steps (b)–(d) are practiced so as to cool the gases in the wetting reactor to a temperature of about 0–20 degrees C. above the dew point.

13. A method as recited in claim 1 wherein steps (b)–(d) are practiced so as to cool the gases in the wetting reactor to a temperature of about 0–10 degrees C. above the dew point.

14. A method as recited in claim 1 wherein step (e) is practiced to provide an layer mass of at least about 50 kg per cubic meter/second of gas introduced during the practice of step (b).

15. A method as recited in claim 1 wherein step (e) is practiced so as to provide an layer at least about 25 cm thick.

16. A method as recited in claim 1 wherein the wetting reactor has reactor walls and a jacket surrounding the walls, and wherein step (b) is practiced so as to introduce at least part of the gases into the reactor through the jacket so that the gases introduced through the jacket prevent the reactor walls from cooling to the extent that solid particles are deposited thereon.

17. A method as recited in claim 1 wherein the wetting reactor has interior walls, and wherein step (b) is practiced so as to introduce at least part of the gases into the reactor downwardly along the interior walls so that the gases prevent the reactor interior walls from cooling to the extent that solid particles are deposited thereon.

18. A method as recited in claim 1 comprising the further step of spraying water downwardly into the wetting zone so that the gases come in contact with downwardly directed spray during the practice of step (b).

19. A method as recited in claim 1 comprising the further steps of discharging a portion of the particles from the layer, recycling or interiorly circulating particles in the wetting reactor, and controlling the rate of recycling or internal circulation by adjusting the rate of discharge of particles from the layer.

20. A method as recited in claim 1 comprising the further step of spraying water or steam into the wetting zone in a plurality of different subzones within the wetting zone.

* * * * *